Patented Nov. 3, 1931

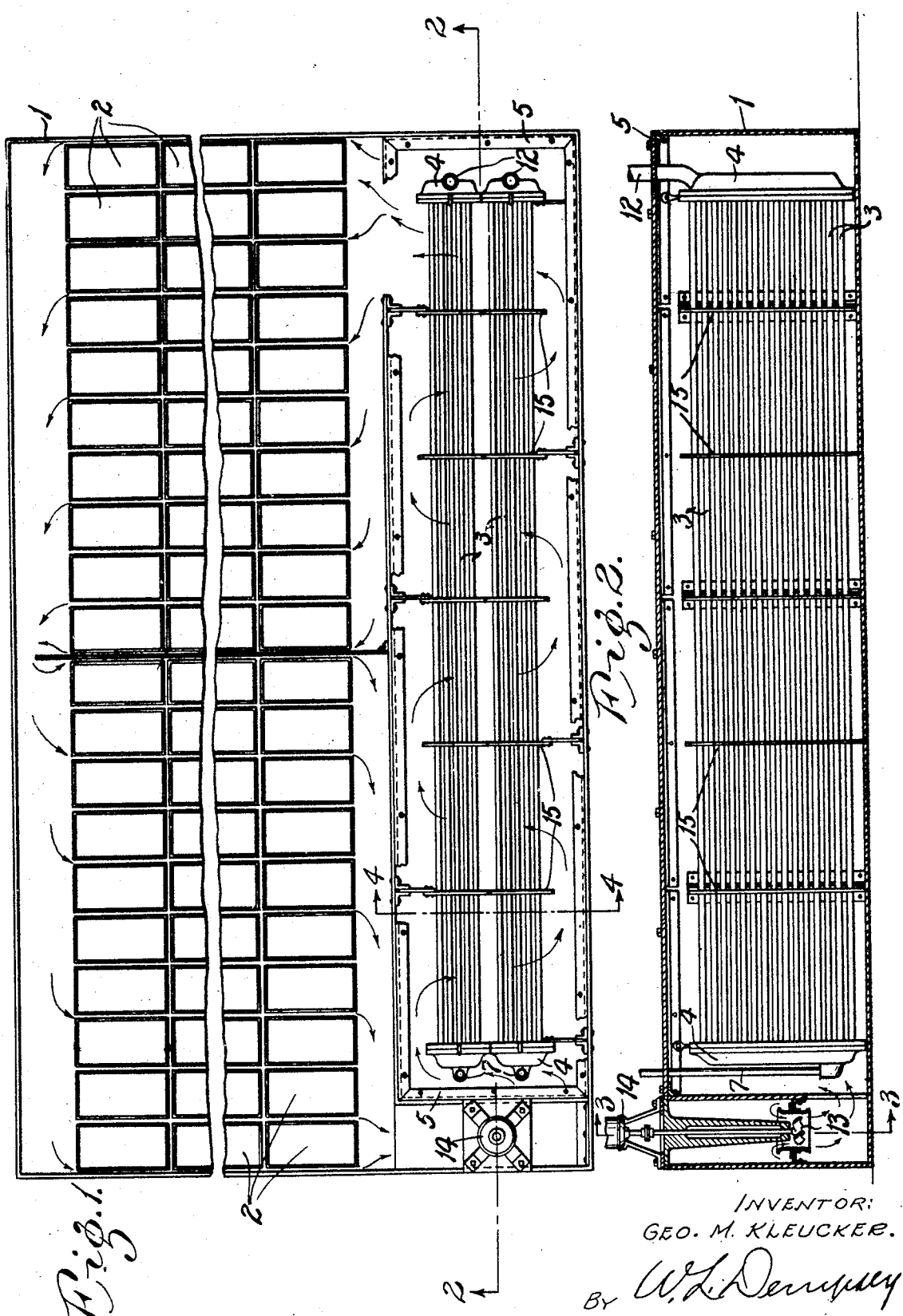

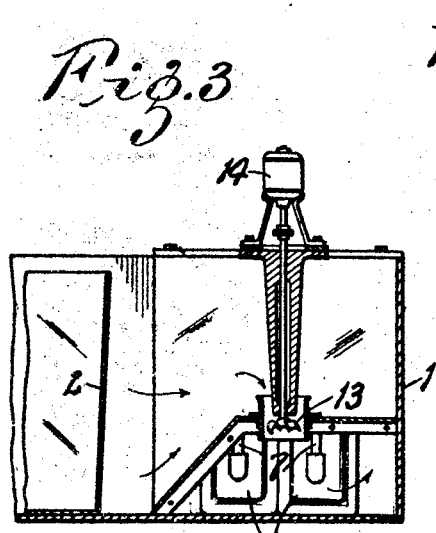
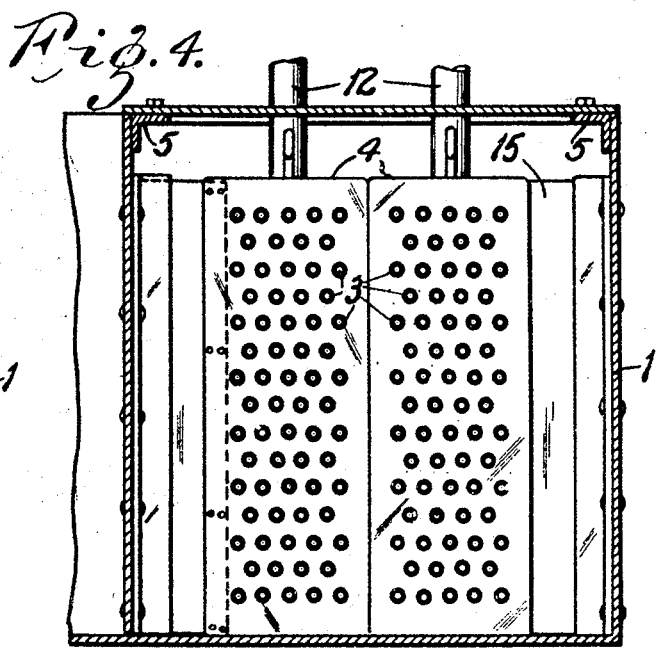
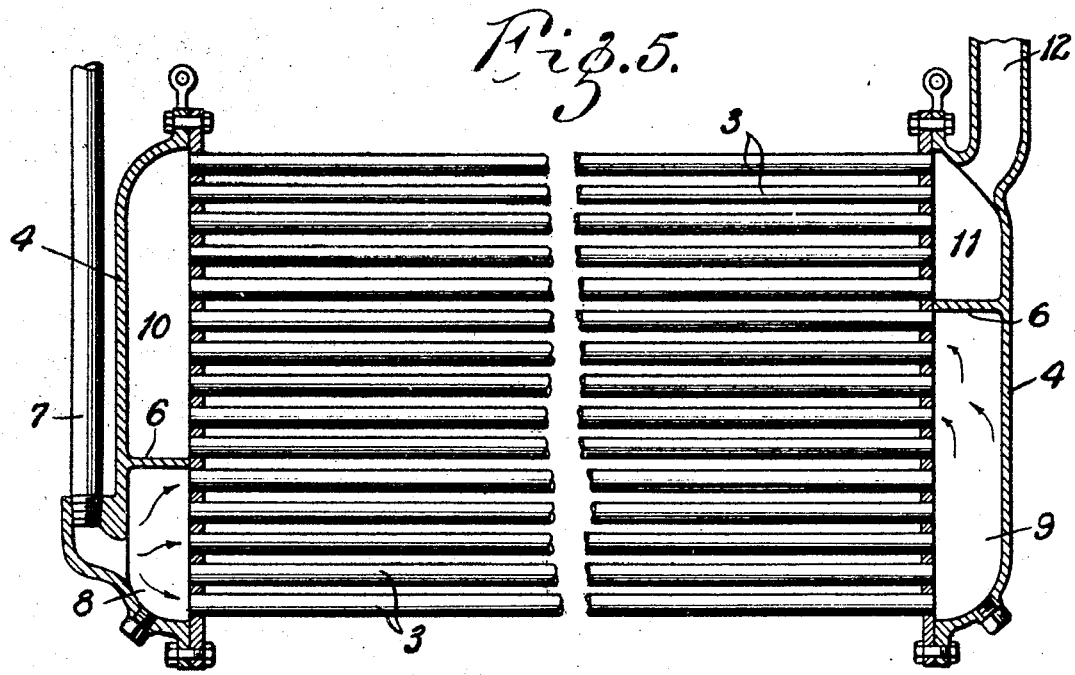

1,829,865

UNITED STATES PATENT OFFICE

GEORGE M. KLEUCKER, OF ST. LOUIS, MISSOURI

REFRIGERATING PLANT

Application filed December 8, 1928. Serial No. 324,600.

This invention relates to refrigerating plants and particularly to freezing tanks and expansion mechanisms.

The primary object of this invention is to provide a readily removable expansion system that may be wholly fabricated at the factory, transported as a unit, and installed in a freezing tank; or, may be removed therefrom for repairs without any change or alteration in the freezing tank.

Another object of this invention is to increase the efficiency of the expansion unit.

A further object of this invention is the construction of expansion units in sections wholly complete within themselves, so that one or more units may be used to regulate the capacity of the plant.

In the drawings:

Fig. 1 is a plan view, broken in two, of a cooling tank, ice cans and my improved expansion mechanism, installed in the freezing tank.

Fig. 2 is a vertical section along the line 2—2 in Fig. 1.

Fig. 3 is a cross section along the line 3—3 in Fig. 2.

Fig. 4 is a cross section along the line 4—4 in Fig. 2.

Fig. 5 is a vertical section through one of the expansion units.

My preferred method of construction, as illustrated in Fig. 1, consists of an open tank 1 adapted to hold a strong brine. A plurality of ice cans 2 are arranged on suitable supports in parallel lines and are filled with water and frozen.

Heretofore, it has been customary to reduce the temperature of the brine in the tank by a system of piping between each row of cans, the piping being attached permanently to the tank 1. In the event of leakage of the refrigerating agent, it becomes necessary to shut down the plant and withdraw the brine from the tank before repairs could be made.

One very serious disadvantage of the old method, as above described, is that the flow of the brine between the rows of cans was always parallel with the piping and the cans, hence a considerable core in the brine stream never came into contact with either the cans or the expansion units so that the efficiency of the system was relatively low.

To avoid the objections above referred, in my improved method of construction the refrigerating agent is expanded in a series of tubes 3 mounted in headers 4 and supported in position in a frame 5, made preferably of angle steel, thus the entire expansion mechanism is a complete and integral unit and may be completely fabricated at the factory, shipped as a single unit and installed by simply lowering it into the brine tank at one side or end with the result that it does not interfere with the placing of the ice cans in parallel rows in close proximity to each other thereby greatly increasing the capacity of a given size tank.

The headers 4 are provided with partitions 6, the liquid refrigerating agent being pumped through the pipe 7 is discharged into the lower chamber 8 of the header, thence expands through a series of tubes into the chamber 9 of the header, thence back through an upper set of tubes to the chamber 10, and returns through the tubes to the chamber 11; and through the pipe 12 the gases are withdrawn by the compressor.

In order to increase the heat exchange between the brine and the refrigerating agent, the brine is kept in circulation by an ordinary propeller 13 which may be driven by the motor 14, or otherwise.

It is obvious that the velocity of the flow and the amount of surface contact made with the expansion tubes determines the efficiency of the heat exchange mechanism. For this reason I have provided a plurality of baffle plates 15, which cause the current of the brine to strike the tubes at approximately right-angles, thus ensuring the entire cross section of the stream of brine coming into immediate and continued contact with the surface of the expansion tubes, as shown by the arrows in Fig. 1.

When the brine leaves the expansion tubes near one end of the brine tank, as shown by the arrows, the brine flows between the ice cans which are much closer together than would be possible were the expansion tubes installed in the old manner between the ice cans, and then returns as indicated by the arrows back to the propeller 13, and repeats the cycle.

It is obvious that the cost of manufacturing will be greatly reduced by a standardized unit that can be manufactured under production conditions; and that by the use of one or more units any desired capacity can be obtained.

While I am aware that baffle plates have long been used to increase the heat exchange between a fire and boiler tubes, as far as the applicant is aware they have never been used to increase the heat exchange of refrigerating units; and while I do not wish to confine myself to the exact structure shown in the drawings and described in the specification, I wish it understood that various changes may be made within the limits and scope of my invention herein set forth.

Having fully described my invention, what I claim as new and useful and desire to protect by Letters Patent is:

An improvement in refrigerating plants, of the class described, comprising a brine tank, ice cans removably disposed in said tank, expansion units unattachably disposed in said tank, means for circulating liquid about said ice cans and said expansion units, said units consisting of a plurality of pipes disposed parallel to each other and joined, in open communication, at each end, water and gas tight, to hollow headers, partitions in said headers so disposed that they cause a return flow of gas or liquid from one header to the other thereby to ensure the flow of liquid or gas through all the pipes joining said headers, baffle plates disposed between said headers, and means for causing liquids and gases to flow through said pipes.

In witness whereof I have hereunto affixed my signature this 20th day of March, 1931.

GEO. M. KLEUCKER.